May 12, 1970    J. P. BURG    3,512,127
DECONVOLUTION SEISMIC FILTERING

Original Filed June 21, 1963    2 Sheets-Sheet 1

John P. Burg
INVENTOR

BY *Melvin Sharp*
ATTORNEY

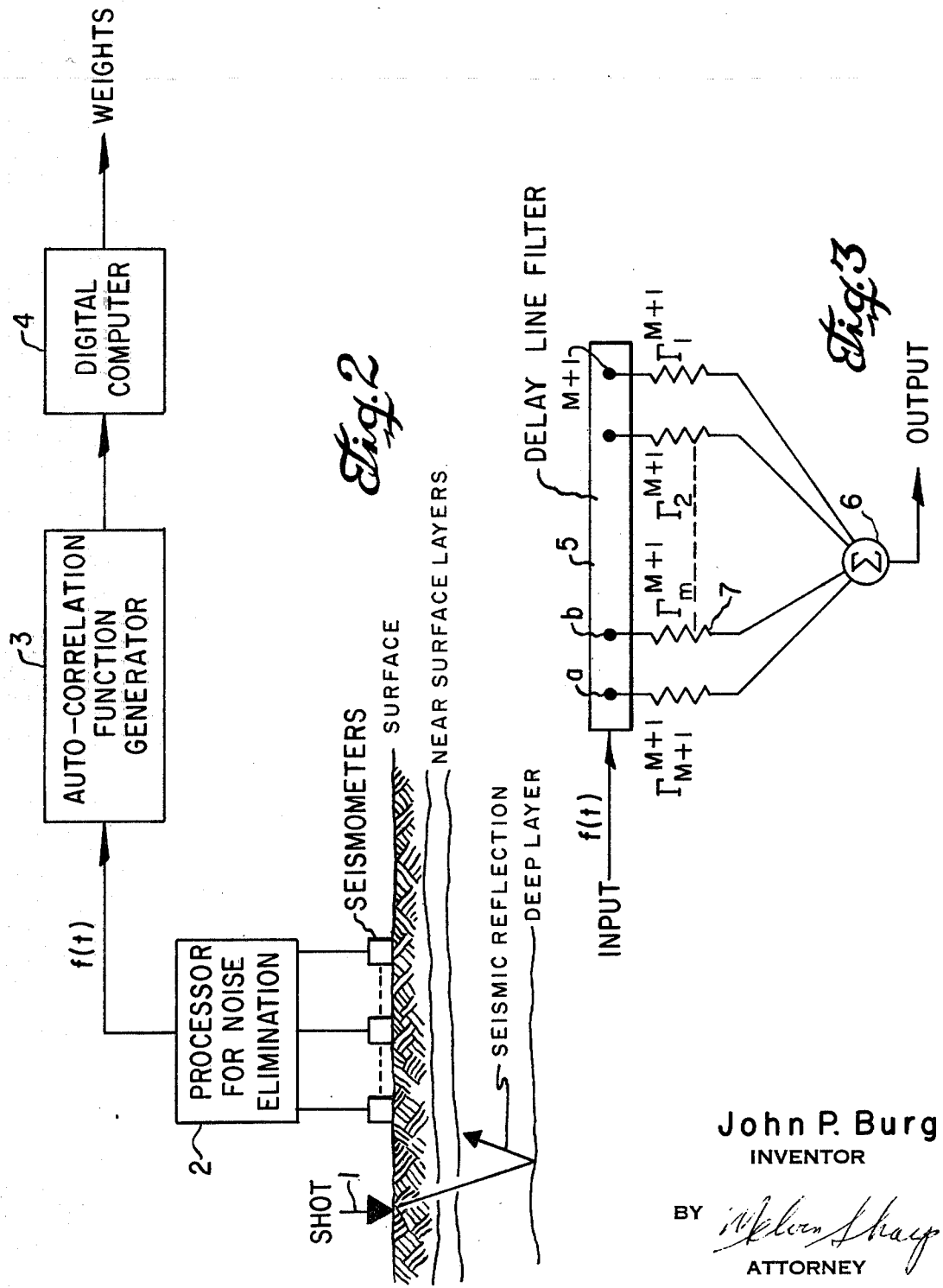

United States Patent Office 3,512,127
Patented May 12, 1970

3,512,127
DECONVOLUTION SEISMIC FILTERING
John P. Burg, Dallas, Tex., assignor to Texas Instruments Incorporated, Dallas, Tex., a corporation of Delaware
Continuation of application Ser. No. 289,581, June 21, 1963. This application Mar. 13, 1967, Ser. No. 622,827
Int. Cl. G01v 1/28
U.S. Cl. 340—15.5                    6 Claims

ABSTRACT OF THE DISCLOSURE

Disclosed is a process for removing multiple interference from relatively noise-free seismic traces by filtering each trace with a time domain filter in which the filter weights bear a specific relationship to the trace being filtered which may be expressed in matrix equation form as:

$$\begin{bmatrix} Y_0 & Y_1 & Y_2 & \ldots & Y_M \\ Y_1 & Y_0 & Y_1 & \ldots & Y_{M-1} \\ Y_2 & Y_1 & Y_0 & \ldots & Y_{M-2} \\ \vdots & \vdots & \vdots & & \vdots \\ Y_{M-1} & Y_{M-2} & Y_{M-3} & \ldots & Y_1 \\ Y_M & Y_{M-1} & Y_{M-2} & \ldots & Y_0 \end{bmatrix} \begin{bmatrix} \Gamma_{M+1}{}^{M+1} \\ \Gamma_M{}^{M+1} \\ \Gamma_{M-1}{}^{M+1} \\ \vdots \\ \Gamma_2{}^{M+1} \\ \Gamma_1{}^{M+1} \end{bmatrix} = \begin{bmatrix} B_{M+1} \\ 0 \\ 0 \\ \vdots \\ 0 \\ 0 \end{bmatrix}$$

where:

$Y_0, Y_1, \ldots Y_M$ are the autocorrelation coefficients of a portion of the seismic trace containing a primary reflection at $M+1$ delay intervals;
$\Gamma_{M+1}{}^{M+1}, \Gamma_M{}^{M+1} \ldots \Gamma_1{}^{M+1}$ are the filter weights at the respective delay intervals designated by the subscripts:
$\Gamma_{M+1}{}^{M+1} \equiv$ a preselected known value;
$M$ is an integer; and
$B_{M+1}$ is uniquely identified by the solution of the equation.

---

This application is a continuation of my earlier application, Ser. No. 289,581, filed June 21, 1963, titled Deconvolution Seismic Filtering, now abandoned.

The invention relates to seismology and seismic prospecting and more particularly to seismic data processing.

In marine seismology where an off-shore explosion is produced by detonating an energy charge below the surface of the water, it is common practice to detect the resulting seismic disturbance and record seismic traces on a seismogram. Each seismic trace contains useful subsurface structure information which is generally obscured by undesirable characteristics in the trace. For example, the primary reflections in the seismic trace useful in interpreting the vertical subsurface structure are obscured by multiple reflections, thereby causing the primary reflections to be unrecognizable. One such undesirable characteristic in the seismic trace is referred to as water reverberation in which multiple reflections are caused by strong, near surface layers or reflectors. These reflectors are the air-water interface and the water-bottom interface. A trap is formed between these interfaces which causes a pulse generated in the trap, or entering the trap from below, to be successively reflected between the two interfaces, with a time interval equal to the two-way travel time and an amplitude decay dependent on the reflection coefficients of the interface reflectors. As a result, a seismic trace having a water reverberation characteristic therein includes primary reflections obscured by a plurality of multiple reflections having decaying amplitude characteristics. The interaction between the pulse or seismic wave and the strong, near surface reflectors is herein referred to as the "reverberation effect." A more detailed discussion of the water reverberation problem in marine seismology is found on pages 223 through 261 in the publication entitled, Geophysics, "Water Reverberation—Their Nature and Elimination, vol. XXIV, No. 2, April 1959, by M. M. Backus.

The reverberation problem is most severe in marine seismology but is not limited thereto. For example, the reverberation problem may exist in on-shore seismic prospecting wherein the area under investigation includes strong, near surface reflectors. The seismic trace produced under these circumstances includes a reverberation characteristic analogous to the water reverberation characteristic.

The term "seismic trace" as used herein refers to an electrical signal having a continuous time function (analogue) such as that obtained from the output of a seismometer responsive to seismic waves or refers to an electrical signal or signals digitally representing said continuous time function. The digital representation of an analogue signal involves sampling the analogue signal at successive points along the analogue signal, which points are spaced in time according to the sampling interval $\Delta t$. The sampled values are then encoded into digital form, thereby producing a digitized seismic trace.

Accordingly, a principal object of the invention is to minimize the reverberation characteristic in a seismic trace in order to increase the intelligibility of the trace.

One feature of the invention is a method of and apparatus for applying an inverse convolution filter to a seismic trace wherein the filter weights are uniquely related to the autocorrelation function of the trace.

Another feature of the invention is a method of generating filter weights related in a unique manner to the auto-correlation function of a seismic trace.

The foregoing and other objects, features and advantages of the invention will be apparent from the following detailed description taken in connection with the appended claims and attached drawings in which:

FIG. 2 is a functional block diagram illustrating the steps of generating filter weights according to the invention.

FIG. 3 illustrates a delay line filter incorporating the filter weights generated by the embodiment illustrated in FIG. 2.

Figure 1:
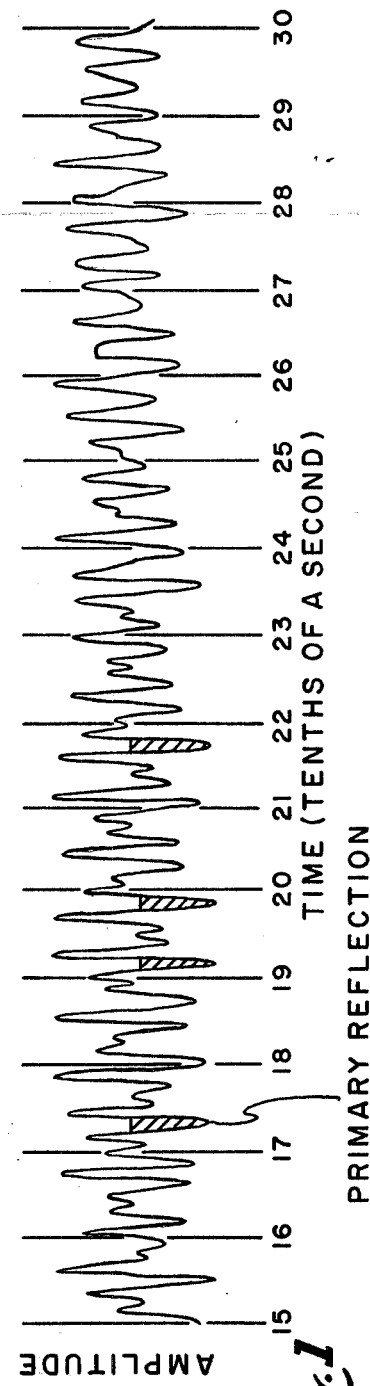
FIG. 1 illustrates a graphical representation of a seismic trace which may be processed according to the invention.

The approach described herein for minimizing the reverberation characteristic in a seismic trace is called "inverse convolution filtering," or deconvolution filtering in which a linear prediction error filter having an impulse time response approximately the inverse of the reverberation effect is applied to the seismic trace.

The seismic trace, detected during the time interval in which a reflection is anticipated from a deep layer, has a repeating waveform (periodicity) caused, in part, by the reverberation effect and additionally caused by the over-all seismic system (seismometer, amplifier, recorder, etc.) response. Therefore, the detected analogue seismic trace $f(t)$ may be characterized as being a function of the subsurface impulse time response $g(t)$ convolved with the reverberation effect $k(t)$ and the over-all seismic system response $h(t)$.

Assuming that the near surface reflectors are characterized by parallel bedding and that the over-all seismic system response $h(t)$ is minimum phase, the linear filter for minimizing the reverberation effect and also minimizing the overall seismic system response, according to the invention, is uniquely determined from the auto-correlation function of the seismic trace. This applies when the subsurface structure includes a single deep layer, as well as when the deep layers are randomly sequenced, which approximates the actual case in reflection seismology.

It was assumed above that the overall seismic system response is minimum phase. However, if it is not, and, if desired, the known overall seismic system response may be removed by conventional inverse filtering prior to deriving the auto-correlation function of the trace.

Neglecting the system response $h(t)$, the prediction error filter to be applied to the seismic trace, in order to attenuate and minimize the reverberation characteristic, has an impulse time response $k'(t)$, where the convolution of $k'(t)$ and $k(t)$ results in a Dirac Delta function $\delta(t)$. That is, $$\delta(t) = \int_{-\infty}^{+\infty} k(\tau) k'(t-\tau) d\tau$$

If $h(t)$ is minimum phase, it is removed by the filter response.

Therefore, the seismic trace $f(t)$ convolved with the impulse time response of the filter produces an output which is the best estimate of the subsurface structure represented by the subsurface impulse time response $g(t)$.

In order to estimate the filter response necessary to give the best estimate of the subsurface structure, the auto-correlation function of the seismic trace is utilized over the time interval in which primary reflections are anticipated. The term auto-correlation function is used herein in the same sense as used in equation (0.424) on page 5 in the publication entitled Extrapolation, Interpolation, and Smoothing of Stationary Time Series, by Norbert Wiener (1950), and for real data is defined as:

$$Y(m\tau) = \frac{1}{T} \int_{t}^{t_1-T} f(t) f(t - m\tau) dt \quad (1)$$

where:

$Y(m\tau)$ = auto-correlation function
$t_1$ to $(t_1+T)$ = the time interval of the seismic trace $f(t)$ in which primary reflections of interest are anticipated.
$\tau$ = sampling interval of the auto-correlation function, and
$m = 0, 1, 2, \ldots M$, that is the number of sampling points.
$M\tau$ = the maximum delay time in the auto-correlation function, which delay time is usually less than $0.10T$.

Once the auto-correlation function for a particular seismic trace is defined, applicant has discovered that a unique set of filter weights may be generated, which weights describe a $(M+1)$ point delay line filter having the desired impulse time response $k'(t)$. The filter weights for the prediction error filter of units prediction distance are defined by the following matrix equation:

$$\begin{bmatrix} Y_0 & Y_1 & Y_2 & \ldots & Y_M \\ Y_1 & Y_0 & Y_1 & \ldots & Y_{M-1} \\ Y_2 & Y_1 & Y_0 & \ldots & Y_{M-2} \\ \cdot & \cdot & \cdot & & \cdot \\ \cdot & \cdot & \cdot & & \cdot \\ \cdot & \cdot & \cdot & & \cdot \\ Y_{M-1} & Y_{M-2} & Y_{M-3} & \ldots & Y_1 \\ Y_M & Y_{M-1} & Y_{M-2} & \ldots & Y_0 \end{bmatrix} \begin{bmatrix} \Gamma_{M+1}^{M+1} \\ \Gamma_{M}^{M+1} \\ \Gamma_{M-1}^{M+1} \\ \cdot \\ \cdot \\ \cdot \\ \Gamma_{2}^{M+1} \\ \Gamma_{1}^{M+1} \end{bmatrix} = \begin{bmatrix} B_{M+1} \\ 0 \\ 0 \\ \cdot \\ \cdot \\ \cdot \\ 0 \\ 0 \end{bmatrix}$$

where:

$Y_0, Y_1, \ldots Y_m$ are the auto-correlation function coefficients defined by Equation 1 for $m = 0, 1, \ldots M$; the subscripts on the auto-correlation function coefficient correspond to respective values of $m$;
$\Gamma_{M+1}^{M+1}, \Gamma_M^{M+1}, \Gamma_{M-1}^{M+1}, \ldots \Gamma_1^{M+1}$ are the filter weights, and the superscript $M+1$ indicates that there are $M+1$ weights and that the matrix is a $M+1$ square matrix of auto-correlation function coefficients;
$\Gamma_{M+1}^{M+1} \equiv 1$
$B_{M+1}$ = part of matrix Equation 2 solution and physically is the average power of the output trace generated by filtering $f(t)$ with the $M+1$ point delay line filter having the weights described by the matrix Equation 2.

The unknown quantities in Equation 2 are the filter weights $\Gamma_M^{M+1}, \Gamma_{M-1}^{M+1}, \Gamma_1^{M+1}$ and the output power $B_{M+1}$. However, these quantities are uniquely defined by Equation 2 and the solution thereof identifies these quantities.

The filter weights defined by Equation 2 are derived on the assumptions that the subsurface impulse time response $g(t)$ over the time period $t_1$ to $(t_1+T)$ is essentially "white," meaning that there is no strong periodicity in the subsurface structure itself, and that the dominant cause of the reverberation characteristic in the seismic trace is the near surface layering. Therefore, the auto-correlation function is utilized to derive the filter weights necessary to "recover" the subsurface impulse time response $g(t)$ from the seismic trace $f(t)$.

By using the following set of recursive equations, the matrix Equation 2 can be solved in a small fraction of the time that it would take using conventional matrix solution techniques:

$$\left. \begin{array}{l} \Gamma_1^1 = 1 \\ B_1 = Y_0 \end{array} \right\} \text{for } m=0 \quad (3), (4)$$

$$\Gamma_1^{m+1} = \frac{-\sum_{j=1}^{m} V_j \Gamma_j^m}{B_m} \text{ for } m=1,2,3, \ldots M \quad (5)$$

$$\Gamma_j^{m+1} = \Gamma_{j-1}^m + \Gamma_1^{m+1} \Gamma_{m+1-j}^m \text{ for } \begin{cases} m=1,2, \ldots M \\ j=2,3, \ldots m+1 \end{cases} \quad (6)$$

$$\Gamma_0^s \equiv 0 \text{ for } s=1,2, \ldots M+1 \quad (7)$$

$$B_m = B_{m-1}[1 - (\Gamma_1^m)^2] \text{ for } m=2,3, \ldots M+1 \quad (8)$$

The above set of Equations 3 through 8 describe a recursive process, whereby the filter weights $\Gamma_1^{M+1}, \ldots \Gamma_{M+1}^{M+1}$ are built up in stair-step fashion from the starting $\Gamma_1^1 = 1$. The diagram below shows this "building" process:

$\Gamma_1^{M+1} \quad \Gamma_2^{M+1} \ldots \Gamma_M^{M+1} \quad \Gamma_{M+1}^{M+1} \quad \ldots m=M, M+1$ LEVEL $\cdot \qquad \cdot \qquad \qquad \cdot \qquad \cdot$
$\cdot \qquad \cdot \qquad \qquad \cdot \qquad \cdot$
$\cdot \qquad \cdot \qquad \qquad \cdot \qquad \cdot$ $\Gamma_1^3 \quad \Gamma_2^3 \quad \Gamma_3^3 \qquad \ldots m=2,$
$\Gamma_1^2 \quad \Gamma_2^2 \qquad \qquad \ldots m=1,$ SECOND LEVEL
$\Gamma_1^1 \qquad \qquad \qquad \ldots m=0,$ FIRST LEVEL (9)

The Equations 3 through 8 describe the mathematical operations for generating the desired weights. The operations are as follows:

First select $\Gamma_1^1 = 1$, whereby $B_1 = Y_0$.

Then set $m=1$, and using Equation 5:

$$\Gamma_1^2 = \frac{-\sum_{1}^{1} Y_1 \Gamma_1^1}{Y_0}$$

From Equation 6:

$$\Gamma_2^2 = \Gamma_1^1 + \Gamma_1^2 \Gamma_0^1 \equiv 1$$

where $\Gamma_0^1 = 0$, Equation 7.

$\Gamma_1^2$ and $\Gamma_2^2$ are defined as the second level weights and are used to define the third level weights illustrated in the above diagram 9.

Now, set $m=2$ and Equation 5 becomes:

$$\Gamma_1^3 = \frac{-\sum_{j=1}^{2} Y_j \Gamma_j^2}{B_2}$$

$B_2$ is obtained from Equation 8 which is:

$$B_2 = B_1[1 = (\Gamma_1^2)^2]$$

$\Gamma_1^3$ is now defined.

Using Equation 6, $$\Gamma_2^3 = \Gamma_1^2 + \Gamma_1^3 \Gamma_1^2$$

and $$\Gamma_3^3 = \Gamma_2^2 + \Gamma_1^3 \Gamma_0^2 \equiv 1$$

where $\Gamma_0^2 = 0$.

It can be seen that weights $\Gamma_5^5$ having like superscripts and subscripts are always equal to one, i.e. $\Gamma_5^5 = 1$.

The third level weights $\Gamma_1^3$, $\Gamma_2^3$ and $\Gamma_3^3$ are now defined and used to find the fourth level weights. The process is continued according to Equations 3 through 8 until the $M+1$ level weights are built up as illustrated in diagram 9.

Equation 8 gives the average output power, $B_{M+1}$, of the trace generated by the delay line filter incorporating the weights described by Equation 2, which filter has a spacing $\tau$ between sample points.

If the output power $B_{M+1}$ indicates that the amplitude of the output trace is not large enough for visual display, the output trace may be amplified or, alternatively, each weight may be multiplied by a positive value A, thereby amplifying the output trace by A. The weight $\Gamma_{M+1}^{M+1}$ is the reference weight from which the other weights $\Gamma_M^{M+1}, \Gamma_{M-1}^{M+1}, \ldots \Gamma_1^{M+1}$, are referenced and therefore, all the weights may be modified by a constant value while still maintaining the desired interrelationship.

In a preferred embodiment of the invention, the above-described recursive process is carried out by a digital computer for generating the filter weights. The input data applied to the digital computer are the auto-correlation function coefficients $Y_0, Y_1, \ldots Y_M$. Since the values of $\Gamma_1^1$ and $B_1$ are defined, they do not have to be applied to the computer input but are incorporated in the computer program. The computer is programmed to carry out the mathematical operations, described by Equations 3 through 8, on the data fed into the computer.

After the $(M+1)$ weights have been generated, they are incorporated into a delay line filter such as that illustrated in FIG. 3. The weights are illustrated by resistors 7 whose resistance values are interrelated according to the values of the weights $\Gamma_1^{M+1}, \Gamma_2^{M+1}, \ldots \Gamma_{M+1}^{M+1}$. Therefore, the weights describe the relative amplitude scale values to be applied to the seismic trace $f(t)$ by the filter. In the example given, the weights are normalized with respect to the weight $\Gamma_{M+1}^{M+1}$ since it is defined as one.

The input to the filter, illustrated in FIG. 3, is the analog sesmic trace $f(t)$ and the output of the filter is an analog trace having the reverberation characteristic eliminated therefrom.

Referring now to FIG. 3, the delay line filter includes a delay line 5 having thereon sample points $a, b, \ldots M+1$. These sample points have a spacing $\tau$ apart. Connected to each sample point is a resistor 7 which in turn is connected to summation network 6. The resistance values of resistors 7 are interrelated according to the weights $\Gamma_1^{M+1}, \Gamma_2^{M+1}, \Gamma_{M+1}^{M+1}$. The delay line 5 may be a series of electrical delay circuits each having a delay $\tau$ between sample points or may be a magnetic drum having the seismic trace $f(t)$ recorded thereon. One such delay line filter which may suitably be used with the invention is illustrated in FIG. 3 of the publication entitled, Geophysics, "Magnetic Delay Line Filtering Techniques," vol. XX, No. 4, October 1955, pages 745–765, by Jones et al.

Referring now to FIG. 2, wherein is disclosed a functional block diagram for generating the previously discussed filter weights, an explosion (shot) is detonated at 1 to create a seismic disturbance in the area under investigation. The mechanical vibrations resulting from the seismic disturbance are detected by a linear array of seismometers and converted into corresponding electrical signals. It should be understood that each seismometer location may include a single seismometer or a group of seismometers in order to produce a single seismic trace corresponding to that location.

Prior to deriving the auto-correlation function of a seismic trace, it is desirable to eliminate the noise components in that trace. To this end, the seismic disturbance is detected by a linear seismometer array and processed by component 2 for producing a single seismic noise-free trace $f(t)$. The processor 2 is a multichannel seismic data processor for eliminating noise and may be of the type disclosed in U.S. Pat. 3,274,541, issued Sept. 20, 1962, to Peter Embree.

In said United States patent, there is disclosed a process for eliminating noise by sampling seismic wave phenomena with a linear seismometer array and producing an output noise-free seismic trace, which trace is effectively "seen" by a sismometer positioned in the center of the array. It should be understood that other techniques for producing a noise-free seismic trace may be employed, including single channel processing techniques. It should further be understood that the use of a processor for eliminating thet noise components in the trace $f(t)$ prior to obtaining the auto-correlation function of the trace is not critical to the invention but only desirable.

The noise-free seismic trace $f(t)$ produced by the process described in said copending application is recorded on magnetic tape and applied to the input of the auto-correlation function generator 3.

Additionally, prior to applying the seismic trace $f(t)$ to the input of the generator 3, and if the overall seismic system response $h(t)$ is not minimum phase, an inverse filter may be applied to the seismic trace to remove the effect of the system response $h(t)$.

A suitable generator 3 for obtaining the auto-correlation function of the seismic trace $f(t)$ is discribed in U.S. Pat. 2,794,965, issued June 4, 1957, to W. J. Yost. Referring now to said patent which is incorporated herein by reference, there is disclosed, in FIG. 4, an apparatus for obtaining the auto-correlation function and a description thereof in column 6, lines 15–66. The seismic trace is recorded on the reproducible record 100 and the auto-correlation function coefficients are produced on the chart 113. The spacing between the detectors 102, 103, etc., defines the sampling interval $\tau$. With regard to Equation 1 in this application detector 102 is the point at which $m=1$, detector 103 is the point at which $m=2$, etc. However, the patent does disclose an auto-correlation function coefficient for the point at which $m=0$. This is accomplished by modifying the apparatus of FIG. 4 by introducing an additional channel therein, in consequence of which the output of detector 102 would be multiplied by itself, integrated and then applied as another point on the chart 113. Thus, according to Equation 1 in this application and utilizing the modified apparatus of FIG. 4 in said patent, a set of $M+1$ auto-correlation function coefficients for the seismic trace $f(t)$ Is obtained.

The output of the auto-correlation function generator 3 is therefore, a set of auto-correlation function coefficients which are described by Equation 1.

The digital computer 4 for generating the filter weights may be the IBM 7074 Digital Computer which includes a peripheral computer, the IBM 1401, for generating the program for the IBM 7074.

The input data applied to said IBM computer is the digitally coded auto-correlation function coefficients produced by generator 3. The program for said IBM computer is obtained by writing the Equations 3 through 8 in Fortran language and arranging the results on IBM 866424 cards which are then fed into the IBM 1401 peripheral computer for generating the program. The digitally coded value of $\Gamma_1{}^1$ and $B_1$ are also included in the program. In this manner, the IBM 7074 computer is used to generate the filter weights defined by Equation 2.

However, it is pointed out that other digital computers may be used to generate the filter weights, for example, the IBM 704, the IBM 1620, the General Electric 225, or the Control Data 1604 Digital Computer. The procedures for programming these computers to perform the arithmetic operations designed by Equation 2 or Equation 3 through 8 are conventional to those skilled in the art.

The invention has herebefore been described in conjunction with an analogue seismic trace $f(t)$ obtained from a seismometer output or from a magnetic tape recording and deriving therefrom its auto-correlation function by the modified apparatus disclosed in the Yost patent. However, this should not be construed in a limiting sense since the analogue seismic trace may be converted into digital form by and analogue to digital converter, recorded on a magnetic tape and thereafter applied as the input to a digital computer such as the IBM 7074 for generating the auto-correlation function coefficients Y. In this regard, the input seismic trace is a digital signal or signals representative of seismic waves as detected or effectively detected at a seismometer location.

When the seismic trace $f(t)$ is represented digitally, the sampling interval used in the analogue to digital converter is referred to as $\Delta t$ and the number of sample points along the trace is N, thereby defining the time interval of the seismic trace ($t_1$ to $t_1+T$) as $N\Delta t$. The sampling interval $\tau$ of the auto-correlation function is usually an integral multiple of $\Delta t$.

The dignitally coded auto-correlation function coefficients Y at the output of the IBM 7074 computer may then be applied to the input of the computer with the appropriate program as previously described in order to generate the filter weights $\Gamma$. Additionally, after the weights $\Gamma$ have been generated, they may be incorporated into the program of the computer in order to process the input digitally coded trace $f(t)$ as functionally illustrated by the delay line filter in FIG. 3.

In FIG. 1, there is illustrated an analogue seismic trace $f(t)$ which has been processed by the multichannel processing technique disclosed in said United States Pat. 3,274,541 for eliminating the noise components in the trace, an apparaent reciprocal velocity passband of $0\pm 2$ ms. of dip/trace was used. The time interval of said trace ($t_1$ to $t_1+T$) is approximately 1.5 seconds. Table I below illustrates the auto-correlation function coefficients Y generated from said trace over its time interval for the sampling interval of $\tau=4$ milliseconds and where $M=79$ sampling points.

TABLE I.—AUTO-CORRELATION FUNCTION COEFFICIENTS

| $m$ | $Y$ | $m$ | $Y$ |
|---|---|---|---|
| 0 | 422,751 | 41 | −63,718 |
| 1 | 240,392 | 42 | −223,476 |
| 2 | −99,730 | 43 | −206,247 |
| 3 | −307,561 | 44 | 33,869 |
| 4 | −233,407 | 45 | 309,868 |
| 5 | −14,287 | 46 | 347,179 |
| 6 | 107,900 | 47 | 95,770 |
| 7 | 53,250 | 48 | −217,906 |
| 8 | −47,741 | 49 | −321,381 |
| 9 | −25,690 | 50 | −160,386 |
| 10 | 130,508 | 51 | 64,256 |
| 11 | 236,924 | 52 | 141,410 |
| 12 | 121,459 | 53 | 54,428 |
| 13 | −163,893 | 54 | −36,449 |
| 14 | −363,490 | 55 | 9,633 |
| 15 | −261,084 | 56 | 143,517 |
| 16 | 60,077 | 57 | 178,493 |
| 17 | 309,990 | 58 | 10,165 |
| 18 | 279,583 | 59 | −249,512 |
| 19 | 39,980 | 60 | −340,807 |
| 20 | −152,734 | 61 | −144,048 |
| 21 | −144,892 | 62 | 181,764 |
| 22 | −13,796 | 63 | 346,811 |
| 23 | 53,267 | 64 | 219,701 |
| 24 | −25,999 | 65 | −46,337 |
| 25 | −134,422 | 66 | −196,431 |
| 26 | −99,953 | 67 | −135,854 |
| 27 | 102,567 | 68 | 8,184 |
| 28 | 284,328 | 69 | 50,090 |
| 29 | 231,811 | 70 | −38,540 |
| 30 | −47,989 | 71 | −117,865 |
| 31 | −310,206 | 72 | −42,623 |
| 32 | −308,715 | 73 | 154,985 |
| 33 | −55,972 | 74 | 272,186 |
| 34 | 197,326 | 75 | 150,471 |
| 35 | 237,250 | 76 | −135,900 |
| 36 | 81,046 | 77 | −327,589 |
| 37 | −66,233 | 78 | −241,088 |
| 38 | −62,922 | 79 | 34,090 |
| 39 | 37,312 | | |
| 40 | 64,175 | | |

Table II below illustrates the filter weights generated from the auto-correlation function coefficients illustrated in Table I.

TABLE II.—WEIGHTS

| $m$ | $\Gamma_{M+1-m}{}^{M+1}$ | $m$ | $\Gamma_{M+1-m}{}^{M+1}$ |
|---|---|---|---|
| 0 | 1.00000 | 41 | 0.04488 |
| 1 | −0.11310 | 42 | 0.10760 |
| 2 | 0.27616 | 43 | 0.01262 |
| 3 | 0.57477 | 44 | 0.08599 |
| 4 | 0.40749 | 45 | −0.13443 |
| 5 | 0.21105 | 46 | −0.08410 |
| 6 | 0.25461 | 47 | −0.00346 |
| 7 | 0.21366 | 48 | −0.00416 |
| 8 | 0.06538 | 49 | −0.02421 |
| 9 | 0.06867 | 50 | −0.05605 |
| 10 | −0.01256 | 51 | 0.03529 |
| 11 | −0.17926 | 52 | 0.04478 |
| 12 | −0.16559 | 53 | 0.02506 |
| 13 | −0.06638 | 54 | 0.03492 |
| 14 | 0.16009 | 55 | 0.02544 |
| 15 | −0.03030 | 56 | 0.02098 |
| 16 | −0.05891 | 57 | 0.03422 |
| 17 | 0.03455 | 58 | −0.06302 |
| 18 | 0.03152 | 59 | −0.00761 |
| 19 | 0.08702 | 60 | −0.03625 |
| 20 | 0.01140 | 61 | −0.04458 |
| 21 | −0.05173 | 62 | −0.01225 |
| 22 | 0.04488 | 63 | 0.01382 |
| 23 | 0.02752 | 64 | 0.00600 |
| 24 | −0.01333 | 65 | 0.00510 |
| 25 | −0.06476 | 66 | 0.01337 |
| 26 | −0.00355 | 67 | 0.01439 |
| 27 | 0.00183 | 68 | 0.00396 |
| 28 | 0.03451 | 69 | 0.03859 |
| 29 | 0.03382 | 70 | −0.00975 |
| 30 | −0.00736 | 71 | −0.00846 |
| 31 | 0.01606 | 72 | −0.00507 |
| 32 | 0.01187 | 73 | 0.03088 |
| 33 | −0.04832 | 74 | 0.01169 |
| 34 | −0.01936 | 75 | −0.03446 |
| 35 | −0.05082 | 76 | −0.00420 |
| 36 | 0.02193 | 77 | 0.01719 |
| 37 | −0.05829 | 78 | 0.01201 |
| 38 | −0.00801 | 79 | 0.01389 |
| 39 | 0.02350 | | |
| 40 | 0.01868 | | |

The negative weights given in Table II means that the signal having that weight applied thereto is polarity reversed prior to application to the summing network.

The sample points and the corresponding weights, the $m$ column and $\Gamma_{M+1-m}^{M+1}$ column in Table II respectively, may be suitably incorporated into the delay line filter illustrated in FIG. 3 as follows:

Referring to FIG. 3, the resistors 7 are adjustable potentiometers and the summing network 6 may be a Philbrick P-2 differential summing amplifier having a positive and a negative input.

A steady state sinusoidal voltage is applied to the input of the delay line filter, the input being labeled "input $f(t)$" in FIG. 3. A low frequency A-C volt meter is connected across the resistor 7, labeled $\Gamma_{M+1}^{M+1}$, to measure the voltage thereacross. The input voltage magnitude is adjusted to set the volt meter reading equal to some convenient predetermined multiple of the actual weight desired which in this case is one. Referring to Table II, the sample point channel $a$ corresponds to $m=0$ and the weight equal to 1. Thereafter, the volt meter is connected across the resistor 7 in sample point channel $b$ corresponding to $m=1$ in Table II. This resistor is adjusted until the direct reading voltage on the volt meter scale is set at the predetermined multiple of 0.11310. All the other weights, $\Gamma_{M-1}^{M+1}$, $\Gamma_{M-2}^{M+1}$ ... $\Gamma_1^{M+1}$ are set by adjusting the respective resistor and reading the volt meter until the reading corresponds to the predetermined multiple of the absolute values of the weights given in Table II.

Each sample point channel is assigned a polarity, positive or negative, according to those given by the weight column in Table II. The positive channels are applied to the positive input of the differential summing amplifier and the negative channels are applied to the negative input of the differential summing amplifier.

The gain factor embodied in the aforementioned predetermined multiple may be removed or adjusted by adjusting the gain of the differential summing amplifier.

The above procedure illustrates one method of incorporating the desired predetermined interrelationship of weights into the delay line filter. However, this may also be accomplished by computation of the resistance values required for each sample point channel.

Figure 4:
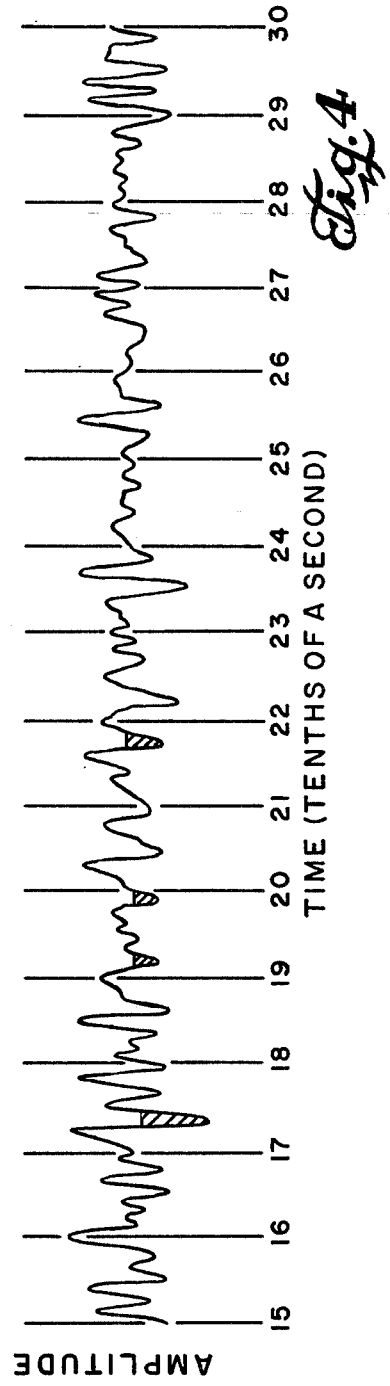
FIG. 4 illustrates a graphical representation of a seismic trace, which trace is the seismic trace illustrated in FIG. 1 processed by the delay line filter illustrated in FIG. 3.

FIG. 4 illustrates the output seismic trace from the filter of FIG. 3 wherein the input $f(t)$ is illustrated in FIG. 1, the weights $\Gamma$ are given by Table II, and the sampling interval $\tau$ is 4 milliseconds.

A comparison of FIGS. 1 and 4 illustrates that the reverberation characteristic has been attenuated. Furthermore, this is particularly illustrated when a plurality of output traces obtained from a seismometer array are correlated on a seismogram.

When the linear filter described by Equation 2 is applied to the input trace $f(t)$, the resulting output trace has a power spectrum wherein the amount of power is approximately constant as a function of frequency. This means that the power response of the filter is inversely proportional to the power spectrum of the input trace $f(t)$. Therefore, an estimate of the power spectrum of the trace $f(t)$ may be obtained by determining the reciprocal power response of the linear filter described by Equation 2. In this connection, the weights generated at the output of the digital computer 4 illustrated in FIG. 2 may be utilized to determine the power spectrum of the seismic trace $f(t)$. This is described mathematically as $$P(f) = \frac{\tau B_{M+1}}{\left| \sum_{j=1}^{M+1} \Gamma_j^{m+1} e^{-i2\pi f j \tau} \right|^2}$$

where:

$P(f)$ = the power spectrum as a function of frequency of the seismic trace $f(t)$ over the time interval $t_1$ to $(t_1+T)$
$\tau$ = sampling interval of the auto-correlation function
$B_{M+1}$ = the average power of the output trace generated by filtering $f(t)$ with the $M+1$ point delay line filter having the weights $\Gamma$ described by the matrix Equation 2.
$\Gamma_j^{M+1}$ = the $M+1$ weights described by matrix Equation 2
$f$ = frequency which varies over the frequency range of the seismic trace $f(t)$.
$j = 1, 2, 3, \ldots M+1$.
$i = \sqrt{-1}$ It is to be understood that the above-described embodiments are merely illustrative of the invention. Numerous other arrangements may be devised by those skilled in the art without departing from the spirit and scope of the invention as defined by the appended claims.

What is claimed is:

1. A method of minimizing the reverbation characteristic in a seismic trace, comprising the steps of:
    (a) generating in an automated processing machine said seismic trace including a primary reflection component and a reverberation component,
    (b) generating in an automated processing machine from at least that portion of said seismic trace which includes said primary reflection component, a plurality of autocorrelation signals representing the autocorrelation coefficients of said seismic trace,
    (c) generating in an automated processing machine a plurality of signals representing successively time-shifted versions of said seismic trace,
    (d) generating in an automated processing machine a plurality of weighted signals representing the magnitudes of said seismic trace and said time-shifted versions modified according to said autocorrelation signals, and
    (e) generating in an automated processing machine a composite signal representing the sum of the representations of said weighted signals, wherein said reverbation component is minimized.

2. A method of minimizing the reverberation characteristic in a seismic trace, comprising the steps of:
    (a) generating in an automated processing machine a plurality of seismic traces obtained from a linear array of seismometers,
    (b) generating in an automated processing machine a composite noise free trace representing a combination of said plurality of seismic traces, said composite trace including a primary reflection component and a reverbation component,
    (c) generating in an automated processing machine from at least that portion of said composite trace which includes said primary reflection component a plurality of autocorrelation signals representing the autocorrelation coefficients of said composite trace,
    (d) generating in an automated processing machine a plurality of signals representing successively time-shifted versions of said composite trace,
    (e) generating in an automated processing machine a plurality of weighted signals representing the magnitudes of said composite trace and said time shifted versions modified according to said autocorrelation signals, and
    (f) generating in an automated processing machine a composite signal representing the sum of the representations of said weighted signals, whereby said reverberation component is minimized.

3. A method of minimizing the reverberation characteristic in a seismic trace comprising the steps of:
    (a) creating a seismic disturbance and detecting the resultant seismic waves to produce a seismic trace representative thereof, wherein said seismic trace includes a primary reflection component and a reverberation component,
    (b) autocorrelating in an automated processing machine at least that portion of said seismic trace which includes said primary reflection component to produce a plurality of autocorrelation signals representing the autocorrelation coefficients of said seismic trace, (c) applying said plurality of autocorrelation signals to an automated date processing machine to produce a plurality of signals representing weights interrelated in magnitude according to the matrix expression:

$$\begin{bmatrix} Y_0 & Y_1 & Y_2 & \ldots & Y_M \\ Y_1 & Y_0 & Y_1 & \ldots & Y_{M-1} \\ Y_2 & Y_1 & Y_0 & \ldots & Y_{M-2} \\ \cdot & \cdot & \cdot & & \cdot \\ \cdot & \cdot & \cdot & & \cdot \\ \cdot & \cdot & \cdot & & \cdot \\ Y_{M-1} & Y_{M-2} & Y_{M-3} & \ldots & Y_1 \\ Y_M & Y_{M-1} & Y_{M-2} & \ldots & Y_0 \end{bmatrix} \begin{bmatrix} \Gamma_{M+1}^{M-1} \\ \Gamma_M^{M-1} \\ \Gamma_{M-1}^{M+1} \\ \cdot \\ \cdot \\ \cdot \\ \Gamma_2^{M-1} \\ \Gamma_1^{M+1} \end{bmatrix} = \begin{bmatrix} B_{M+1} \\ 0 \\ 0 \\ \cdot \\ \cdot \\ \cdot \\ 0 \\ 0 \end{bmatrix}$$

where $Y_0, Y_1 \ldots Y_M$ are the autocorrelation function coefficients of said seismic trace, $\Gamma_{M+1}^{M+1}$, $\Gamma_M^{M+1}, \ldots \Gamma_1^{M+1}$ are the relative magnitudes of said weights, $\Gamma_{M+1}^{M+1}$ equals a preselected known value, $B_{M+1}$ is uniquely identified by the solution of the equation, and M is an integer, (d) generating in an automated processing machine a plurality of signals representing time-shifted versions of said seismic trace, (e) generating in an automated processing machine a plurality of weighted signals representing the magnitudes of said seismic trace and said time shifted versions modified in amounts relatively proportional to said weights, and (f) generating in an automated processing machine a composite signal representing the sum of the representations of said weighted signals, wherein said reverberation component is minimized.

4. The method according to claim 3 wherein said plurality of signals in step (d) representing time-shifted versions of said seismic trace represent M traces successively time-shifted with respect to said seismic trace $m\tau$, where $\tau$ is a constant and $m$ equals 1, 2, . . . M, respectively corresponding to said M traces.

5. A method of minimizing the reverberation characteristic in an electrical seismic trace comprising the steps of: creating a seismic disturbance and detecting the resultant seismic waves at a plurality of detecting locations to produce a respective plurality of electrical seismic traces representative of said seismic waves, applying said electrical seismic traces to a processor to produce a noise-free electrical trace including a primary reflection component and a reverberation component, applying at least that portion of said noise-free electrical trace which includes a primary reflection component to an auto-correlation function generator to produce a plurality of electrical potentials representative of the auto-correlation function coefficients of said noise-free electrical trace, applying said noise-free electrical trace to a time-shifting means for successively time shifting said noise-free electrical trace to produce a plurality of time-shifted electrical traces, applying said noise-free electrical trace and said plurality of time-shifted electrical traces to a means for modifying them according to said plurality of electrical potentials, and applying said modified electrical traces to a summation means for compositing them to produce a composite electrical trace wherein said reverberation component is minimized.

6. A method of minimizing the reverberation characteristic in an electrical seismic trace comprising the steps of: creating a seismic disturbance and detecting the resultant seismic waves to produce an electrical seismic trace including a primary reflection component and a reverberation component, applying at least that portion of said electrical seismic trace which includes said primary reflection component to an auto-correlation function generator to produce a plurality of electrical potentials representative of the auto-correlation function coefficients of said electrical seismic trace, applying said electrical seismic trace to a time-shifting means for successively time-shifting said electrical seismic trace to produce a plurality of time-shifted electrical traces, applying said electrical seismic trace and said plurality of time-shifted electrical traces to a means for modifying them according to said plurality of electrical potentials, and applying said modified electrical traces to a summing means for compositing them to produce a composite electrical trace wherein said reverberation component is minimized.

References Cited

UNITED STATES PATENTS 2,794,965 6/1957 Yost.
3,242,326 3/1966 Cox.
3,015,085 12/1961 Piety _____ 340—15.5

OTHER REFERENCES

Turin: An Introduction to Matched Filters, IRE Transactions of Inf. Theory, vol. IT-6, No. 3, June 1960, pp. 311-325.

Gilmore: Bionic Computers, in Electronics World, March 1963, pp. 25-28, 63, 64.

RODNEY D. BENNETT, JR., Primary Examiner

D. C. KAUFMAN, Assistant Examiner